Feb. 10, 1942. W. C. SHRIVER 2,272,532
BRAKE LINING CONSTRUCTION
Filed Aug. 23, 1941
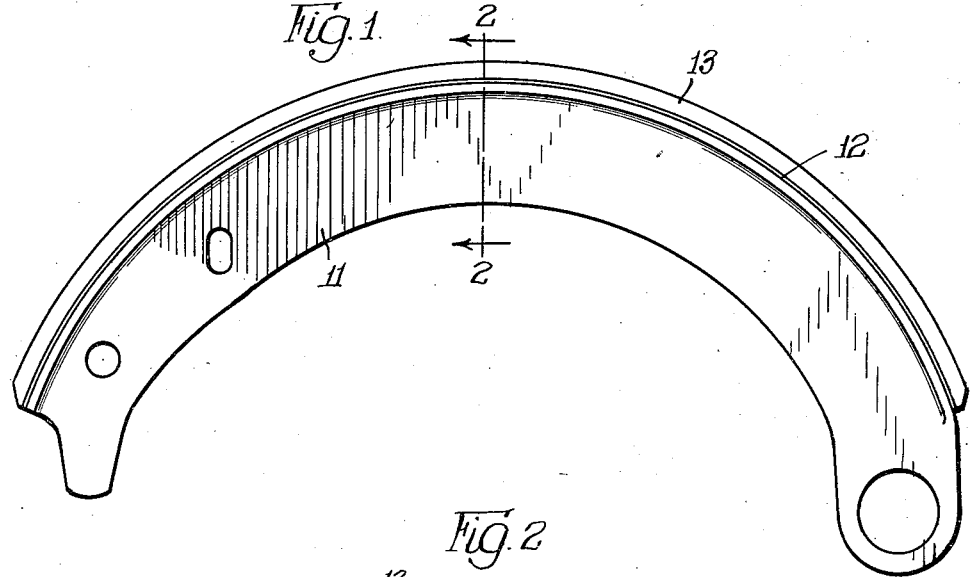
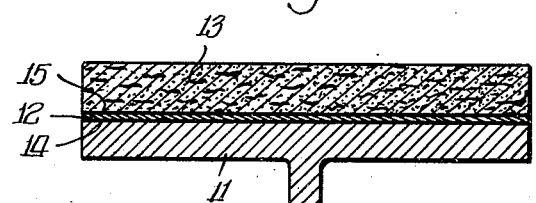
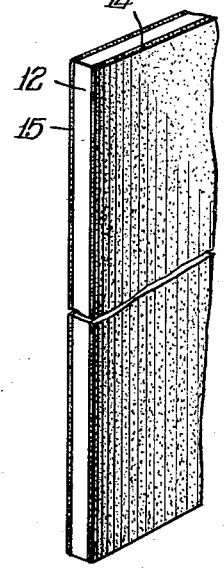
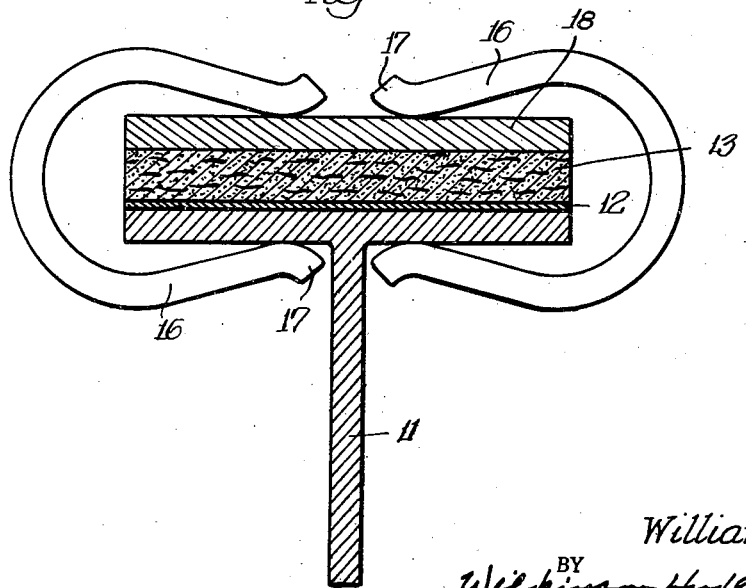
INVENTOR.
William C. Shriver,
BY
Wilkinson Huxley Byron & Knight
ATTYS.

Patented Feb. 10, 1942

2,272,532

UNITED STATES PATENT OFFICE 2,272,532

BRAKE LINING CONSTRUCTION

William C. Shriver, Huntington, Ind., assignor to Asbestos Manufacturing Company, Huntington, Ind., a corporation of Indiana Application August 23, 1941, Serial No. 408,017

7 Claims. (Cl. 188—234)

This invention relates to a new and improved brake lining construction and method of applying the lining to brake shoes or the like.

While the invention is particularly applicable to brakes for motor vehicles, it may also be applied to other uses as, for example, in connection with clutches of various types.

Brake construction in general use involves a metallic supporting structure such as a brake shoe or brake band and a brake lining secured to the shoe. These brake linings are formed of a wide variety of compositions and materials, but those in most general use today are relatively hard and stiff. They are designed to give a good braking surface, to resist wear and abrasion and to withstand relatively high temperatures which are generated by the braking action. Brake linings wear in use and require periodic replacement.

The usual method of securing the brake lining to the supporting structure is by means of rivets. Registering perforations are formed in the lining and shoe and those in the lining are deeply countersunk. Contact of the rivets with the brake drum or other braking surface is undesirable as the rivets tend to score the drum, the surface of which in many cases is of cast iron. The use of rivets in securing the lining to the shoe is undesirable for many reasons. It wastes the thickness of the lining below the level of the heads of the rivets. The countersunk openings constitute a loss of braking surface which normally amounts to from five to ten percent of the braking area. Further, the countersunk openings serve to pick up grit, slivers or pieces worn from the shoe or brake drum and other foreign matter and to carry them against the drum during braking operation which scores the braking surface and renders it less effective. There is also a tendency for the lining to bulge outwardly between rivets when it is applied. This not only makes braking irregular until the outer surface of the lining is worn to a circular arc in use, but when worn thin the lining between rivets may flex downwardly and be less effective.

When brake drums have become worn and scored in use, it is necessary to turn down the inner surfaces to smooth them. This is usually done at the time brakes are relined and it is then customary to apply oversize or extra thick brake lining to the shoes so that the brake mechanism will be effective over the usual range of operation. The necessity in some cases for such oversize lining requires the brake relining station to carry a large inventory of lining to meet all possible requirements.

There have been some attempts to provide brake constructions in which the linings are glued or cemented to the shoes or bands. One objection to such construction lies in the difficulty in removing residual lining from the shoes to prepare them for relining. The brake lining normally wears to a greater extent at the center of a brake shoe than at the ends. The ends may still be covered by a substantial thickness of lining when the middle of the shoe is worn bare. This lining at the ends must be removed and the entire shoe surface cleaned before applying the new lining. Since the lining is designed to resist abrasion, it is difficult and expensive to remove it by grinding. The lining of the hard type normally used in such cases is brittle and its removal by means of a chisel takes time and labor and is likely to scar and injure the brake shoe surface.

According to the present invention the brake lining is bonded to the shoe without rivets, and with an intermediate element in between the main body of lining and the shoe. This intermediate element may be made in varying thicknesses or may be used in multiple thickness. It is preferably formed of brake lining material which will give an effective braking action if exposed, due to wear of the main body of the lining. It is formed of laminated or relatively soft material which may be readily stripped or ground from the brake shoe or band.

It is an object of the present invention to provide a new and improved brake construction and method of assembling the same.

It is also an object to provide a brake shoe construction in which the lining is effectively bonded to the drum without the use of mechanical securing means.

It is an additional object to provide a construction in which the lining or any remaining portion thereof may be readily removed from the shoe and the shoe cleaned for relining.

It is a further object to provide a construction in which standard thicknesses of brake lining may be used with variable or multiple thicknesses of intermediate securing means, to give differing total thicknesses of material upon the shoe to meet varying requirements.

It is another object to provide a method for securing lining to a brake shoe or other support whereby the lining may be quickly and positively secured in place.

It is an additional object to provide a method which may be carried out with a minimum of special apparatus and by relatively unskilled labor.

Other and further objects will appear as the description proceeds.

A preferred embodiment of the invention is shown in the accompanying drawing, in which—

Figure 1 is a plan view of a brake shoe assembly with the lining applied according to the present invention;

Figure 2 is a fragmentary section on an enlarged scale taken on line 2—2 of Figure 1;

Figure 3 is a perspective fragmentary view on a still larger scale, showing the intermediate member; and Figure 4 is a view similar to Figure 2 and on the same scale but showing the parts clamped during the assembling operation.

As shown in Figures 1 and 2, the brake assembly comprises the shoe 11, the intermediate member 12 and brake lining 13. The intermediate member 12 is bonded to the shoe by a layer 14 of adhesive material and is similarly bonded to the lining 13 by a layer 15 of the same type of material. It will be understood that for the sake of clearness the drawings exaggerate the thickness of the bonding material 14, which may be extremely thin and which in the finished article may largely have penetrated into the intermediate member 12 and the brake lining 13.

The intermediate member 12 is preferably formed of brake lining material, that is, material which will operate effectively to give a braking action when pressed against the brake drum, which may occur when the outer brake lining material 13 is worn down. The material 12 is substantially softer than the material of the brake lining 13 proper, and preferably this material 12 is laminated in character. The bond between the several layers is such that there is no tendency for separation of the plies, due to the circumferential component of the reaction of the lining 13 against the associated brake drum in the braking operation. The material may not be actually laminated in character, provided it is separable along lines roughly parallel to its faces. It may comprise flakes or fibres of material, such as asbestos, mica or the like, suitably bonded, with the flakes or fibres running approximately parallel to the faces of the material. The material 12, however, is of such a character that the brake lining 13 or any remaining portion thereof may readily be split off from the shoe 11 by use of a cold chisel inserted at the edges of the layer 12. It will be understood that a portion of this layer 12 would adhere to the portions of the brake lining 13 which were removed, while another portion of layer 12 would adhere to the brake shoe 11. In other words, the layer 12 is cleavable and more readily split than the bond between that layer and the shoe 11 and lining 13.

The lining 13 is normally of a hard, dense character especially adapted for braking purposes. The particular composition of the material used is no part of the present invention and need not be further described herein. Linings of this character, however, are somewhat brittle and would tend to break up if they were bonded directly to the shoe and an attempt were made to remove them from the shoe. The character of the bond used in the present invention is such that the lining material 13 would tend to break up rather than split from the shoe if a cold chisel were applied against the side or end of the brake lining member directly bonded to the shoe. The removal of such a directly bonded lining would, therefore, require a great deal of labor as it would require repeated chipping and after the completion of the chipping operation fragments of the lining would still be bonded to the shoe and would require removal by abrasion. Since the lining 13 is especially designed to resist abrasion, this final removal would involve time and labor costs as well as wear on the abrasive material. In order to get an effective bond between the lining and shoe, the shoe surface should be smooth, and the removal of a directly supported layer by means of a cold chisel or the like would score the shoe surface and render it undesirable for use unless it were ground and smoothed down. On the other hand, with the use of the intermediate layer 12, the hard lining 13 may be very easily removed and the remaining portions of layer 12 and of the adhesive which are upon the shoe 11 may be quickly removed by a grinding operation, leaving the shoe surface smooth and ready for application of a new lining.

The particular adhesive material used in layers 14 and 15 forms no part of the present invention and need not be discussed in detail herein. It has been found preferable, however, to use as adhesives various types of synthetic resins, of which the vinyl resins are typical. In the preferred method of forming the brake shoe assembly the incompletely reacted resin in liquid form or carried in a solvent is deposited upon both faces of the intermediate member 12. It will be understood that this member may be commercially formed as a continuous strip and supplied to the user in rolls of varying widths to be cut in lengths as used. The adhesive or bonding material, after application to both sides of the strip, is dried or partially reacted so as to become integrally connected to the member 12. It also is preferably brought to a point where its surface is not tacky or adhesive, although it may be packaged in the manner customary with certain adhesive tapes by interposing layers of glazed cambric or similar material as it is rolled for storage or shipment.

The assembly is made in the field by the men relining the brakes, who first clean the braking surface of the drum 11 to be relined. A piece of the material 12 of the necessary length is then cut from the strip and placed upon the outer face of the shoe 11. It will be understood that commercially this intermediate member 12 may be provided in varying widths to suit standard types of brake shoes or may even be furnished in large sheets to be cut into desired shape by the users. The brake lining member 13 is then placed upon the outer face of the member 12, after which a clamping or cover member 18, formed of sheet metal, is placed upon the outer face of the brake lining 13, as shown in Figure 4. The assembly is held together in position by means of spring clips 16, the jaws of which have outturned ends 17. These clips are formed of heavy and resilient material and may readily be put in place by means of a hammer or maul, being driven on from the side of the shoe. The cover member 18 is heavy enough to have considerable inherent rigidity, and a large number of clips 16 are placed along each side of the shoe so that the assembled shoe, intermediate member and lining are held intimately and firmly together under substantially uniform pressure throughout their opposed surfaces.

With the preferred type of bonding material, this assembly, including the clamping clips, is then placed in an oven and given such a heat treatment as is necessary to substantially completely react the adhesive layers 14 and 15. This treatment, for example, may consist of maintaining the assembly at a temperature of 350 to 400 degrees F. for a period of approximately thirty minutes. After the heat treatment, the clips 16 and cover member 18 are removed and the assembly is ready to be applied to the motor vehicle and to go into service for braking purposes.

While reference throughout has been made to brake lining and brake shoes, it is to be understood that the same method of assembly may be applied to brake bands or clutches or other forms of apparatus requiring similar facings or mountings. While only a single layer of the intermediate material 12 has been shown in Figures 2 and 4, it will be understood that a multiplicity of layers may be used if desired. This will sometimes be desirable where the associated brake drum has been turned down because of scoring and an oversize lining is necessary to give the full braking action throughout the normal range of adjustments of the parts. The use of this intermediate material very materially cuts down the inventory which need be maintained at brake relining stations, since it will be only necessary to carry brake lining of standard thickness. If desired, the lining material 12 may be furnished in various thicknesses rather than be used as multiple layers. This will add very little to the inventory necessary, since the material 12 need not be furnished in a multiplicity of stock sizes but can be cut to size as used. Due to its relative thinness and the fact that it is composed of the relatively soft brake lining material, the sheets 12 may readily and easily be cut or trimmed.

While a preferred embodiment of the invention has been disclosed, it will be understood that it is capable of variation to meet differing conditions and requirements. For example, other types and forms of shoes may be used and other means may be used for clamping the material to the shoe or other backing member during the process of reacting the adhesive or bonding material. Such modifications are therefore contemplated as come within the spirit and scope of the appended claims.

What is claimed is:

1. A brake assembly comprising a brake shoe, a brake lining member, said member being formed of hard, frangible material, and an intermediate member bonded to the shoe and lining, the intermediate member comprising a thin sheet of cleavable brake lining material.

2. A brake assembly comprising a brake shoe, a brake lining member, said member being formed of hard frangible material, and an intermediate member bonded to the shoe and lining, the intermediate member comprising a thin sheet of brake lining material, said material being laminated.

3. A brake assembly comprising a brake shoe, a hard brake lining member, and an intermediate member bonded to the shoe and lining, the intermediate member comprising a thin sheet of cleavable brake lining material, said material being substantially softer than the brake lining member.

4. A brake assembly comprising a brake shoe, a hard brake lining member, and an intermediate cleavable connecting member bonded to the shoe and lining by means of thin layers of synthetic resin reacted in place.

5. The method of producing a brake shoe and lining assembly which comprises placing upon the braking surface of the shoe a layer of adhesive, a thin layer of cleavable brake lining material, a second layer of adhesive, a layer of hard, preshaped brake lining of normal thickness, and bonding the several layers by means of said adhesive by applying heat to the assembly while applying pressure substantially uniformly thorughout the braking area in a direction normal to the braking surface.

6. The method of producing a brake shoe and lining assembly which comprises placing upon the braking surface of the shoe a layer of adhesive capable of being softened and reacted by heat, a thin layer of flexible, relatively soft brake lining material, a second layer of adhesive, a layer of hard, preshaped brake lining of normal thickness, and bonding the several layers by means of said adhesive by applying heat to the assembly while applying pressure substantially uniformly throughout the braking area in a direction normal to the braking surface to substantially completely react the two layers of adhesive.

7. The method of producing a brake shoe and lining assembly including a brake shoe, an intermediate lining member and a brake lining member which comprises applying a thin layer of an incompletely reacted synthetic resin to both faces of the intermediate member, placing said member upon the braking face of the shoe, placing the brake lining member upon the outer face of the intermediate member, and applying heat and pressure to the assembly until the resin is substantially completely reacted, bonding the shoe, intermediate member and brake lining member together.

WILLIAM C. SHRIVER.